(12) United States Patent
Gymer et al.

(10) Patent No.: US 8,156,025 B1
(45) Date of Patent: Apr. 10, 2012

(54) COMPUTER-IMPLEMENTED SYSTEMS AND METHODS FOR STUDENT LOAN APPLICATION PROCESSING

(75) Inventors: Matthew J. Gymer, Bratenahl Village, OH (US); Kevin Lawrence O'Toole, Avon Lake, OH (US)

(73) Assignee: National City Bank, Cleveland, OH (US)

( * ) Notice: Subject to any disclaimer, the term of this patent is extended or adjusted under 35 U.S.C. 154(b) by 0 days.

(21) Appl. No.: 12/269,305

(22) Filed: Nov. 12, 2008

Related U.S. Application Data

(60) Provisional application No. 61/100,978, filed on Sep. 29, 2008.

(51) Int. Cl.
*G06Q 40/00* (2006.01)
(52) U.S. Cl. .......................................... 705/35; 705/38
(58) Field of Classification Search .................... 705/35, 705/38
See application file for complete search history.

(56) References Cited

U.S. PATENT DOCUMENTS

| | | | |
|---|---|---|---|
| 5,765,144 A * | 6/1998 | Larche et al. | 705/38 |
| 2003/0093346 A1 | 5/2003 | Weber | |
| 2003/0233316 A1* | 12/2003 | Hu et al. | 705/38 |
| 2004/0088246 A1* | 5/2004 | Jepsen et al. | 705/38 |
| 2005/0004807 A1 | 1/2005 | Fenstermaker et al. | |
| 2006/0265258 A1 | 11/2006 | Powell et al. | |
| 2007/0196794 A1* | 8/2007 | Thornton | 434/118 |

OTHER PUBLICATIONS

Gymer, Matthew J., " 'Retained Equity': Understanding the Impact of Self Service Technology on Brand Trust Within the Context of Financial Aid Administration," Case Western Reserve University, 57 pp. (Dec. 2005).

* cited by examiner

*Primary Examiner* — Shahid Merchant
(74) *Attorney, Agent, or Firm* — Jones Day

(57) ABSTRACT

Computer-implemented systems and methods are provided for applying for student loans. A system can include graphical user interfaces for providing a series of questions to a user which relate to the applying of the student loans. At least a majority of the questions are provided to the user without reference to any specific student loan application. The responses are used to populate multiple different student loan applications.

27 Claims, 33 Drawing Sheets

National City®

Sign In:
Get helpful reminders and track your progress through the financial aid process.

Email:

Password: forgot your password?

Create Account:   [Sign In]

Why Sign Up?
- Track the status of your loan application online
- Never have to fill in the same application information twice
- Get helpful alerts as for upcoming financial aid milestones Related Videos & Study Guides

| Screen shot from video | College Financing 100 |
| --- | --- |
| | Introduction to your Education |

| Screen shot from video | College Financing 101 |
| --- | --- |
| | What makes college so expensive? |

Student Aid Specialist
1-800-555-5097

Student Loans
Financing your education is easier rewarding than ever. We can guide entire process and design informat you and your needs. From reminding deadlines to saving and carrying i from one application to the next. simple.

Student Loans
Find out more about the loans outlined in your award letter

[Student Loan Application Guide ⇨]

Or, Apply Directly:
- Subsidized Stafford Loan
- Unsubsidized Stafford Loan
- Parent PLUS Loan
- Graduate PLUS Loan
- National City Undergraduate Loan

Going back to College?
Renew your loans with just a few

Get

MATCH TO FIG. 2B

National City

- Home
- Planning for College
- Financing Education
  - Savings
  - Grants & Scholarships
  - Government Loans
  - Private Loans
- Student Loan Application Guide
- Consolidate Loans
- Renew Loans Related Videos & Study Guides

| Screen shot from video | College Financing 201 |
| | Paying your Total Cost of Degree (TCD) |
| Screen shot from video | College Financing 251 |
| | A brief History on Student Loans |

[PDF] Parent Study Guide

Student Aid Specialist
1-800-555-5097

---

Karl's Finan

Karl wants to go to an in-state public $40,000 a year, and education. Karl's per year includes: on-campus room and supplies.

| Karl | Veronica |

Financing Education

The right college finance option dep include a combination of savings, c

Read more below about different typ individual case studies.

Savings

How much money do you have saved fo evaluate any savings accounts you h

College Grants & Schola

Free money to finance college! Whet available through your school and

Government Loans

National City offers a number of fe financial situation, you may be eli

Private Loans

National City offers private loans the most competitive in the industr

MATCH TO FIG. 3B

*Fig. 3A*

```
                                                          Sign In
                                        Contact Us: 1-800-555-4932
``` cial Plan:

| The Ohio State University- | Savings: | $ 3,000 |
| university. His parents make | Scholarships & Grants | $ 10,000 |
| have saved $3,000 for his | Government Loans: | $ 2,500 |
| total estimated cost of $15,000 | Private Loans: | $ 0 |
| tuition, personal expenses, | Total: | $ 15,500 |
| board, and books and | | |

| | Josh | Adam | Megan | ends on your family's financial situation and needs. The ideal budget will
ollege scholarships, government and private loans, and college grants.

es of school finance options, or click above to read more detailed r college? Are your parents contributing any savings? Make sure you
ave for potential contribution to your college finance plan.

rships
her need- or achievement-based, check out the grants and scholarships
the government. We'll help you learn how.

deral government loans. Regardless of your family's individual
gible for these to help you finance college.

to most families, regardless of financial need. Our loans are among
y. something your parents will be proud of. Learn more

*Fig. 3B*

National City®

Home

Planning for College

Financing Education

Savings

Grants & Scholarships

Government Loans

Private Loans

Student Loan Application Guide

Consolidate Loans

Renew Loans

Related Videos & Study Guides

| Screen shot from video | College Financing 290 Filing your FAFSA |
|---|---|
| Screen shot from video | College Financing 301 Stafford Loans |
| Screen shot from video | College Financing 303 PLUS Loans |

 FAFSA Study Guide

 Federal Loan Study Guide

Student Aid Specialist
1-800-555-5097

Government Loans

Government student loans offer the lo
cases, the interest on your student l
college. The Government determines yo
based on the Federal Application for
colleges that you applied for work wi
most economical combination of loans
The award letter that you receive fro
of loans.

---

Federal Subsidized Stafford Loan

Federal Subsidized Stafford Loans a
because the government pays the int
Eligibility for this loan is need b
their school's Financial Aid Award Who It's For: Eligible students loo
more credit hours)

---

Federal Unsubsidized Stafford Loan

Unsubsidized Stafford Loans, like S
lowest rates available. However, th
you are in school. You have the opt
it to accumulate and then begin pay Who It's For: Eligible students loo

---

Federal Parent PLUS Loan

Parent PLUS Loans allow the parents
the Expected Family Contribution in

Who It's For: Parents of college st
cost alternative to private loans on

MATCH TO FIG. 4B

*Fig. 4A*

Sign In

Contact Us: 1-800-555-4932 west available rates. In some
oan is paid for you while you attend
ur eligibility for these loans
Student Aid (FAFSA). The
th the Government to produce the
that meet your financial need.
m the school will contain this list Picture of the bottom of
a student aid award letter (where the loans
are listed)

6.8% APR re among the most economical loans available,
erest on the loan while you are in school.
ased and is communicated to the student through
letter.

king to attend College half-time or more (6 or

[Show Details] [Apply]

6.8% APR ubsidized Stafford loans, have one of the
e government does not pay the interest while
ion to pay the interest during school or allow
ment after graduation.

king to attend College half-time or more.

[Show Details] [Apply]

8.5% APR of college students to cover the remainder of
a cost-effective way.

udents without perfect credit that want a lower
d are willing to co-sign for the life of the loan.

[Show Details] [Apply]

Monthly Payments:

Use the sliders below
to see what your monthly
payments could be:

$0 while in school $86 after graduation

Amount Borrowed: $5,000

Payment begins:

[Full Deferral ▽]

Interest rate: 6.25%

Pay loan off over: 10 years

Disclosures

[Learn about Private Loans ⇨]

MATCH TO FIG. 4A

*Fig. 4B*

National City®

Home

Planning for College

Financing Education

Student Loan Application Guide

Consolidate Loans

Renew Loans

Sign In:

Get helpful reminders and track your progress through the financial aid process.

Email:

Password: forgot your password?

Create Account:  [Sign In]

Student Aid Specialist
1-800-555-5097

Monthly Payments:

Use the sliders below to see what your monthly payments could be:

$0 while in school $86 after graduation

Amount Borrowed: $5,000

Welcome to the Student Loan Application Guide

Once you pick out the school you want to attend can help guide you through the process of obtai funds you need for college. Personalizing this you to track your progress along the way and ge reminders for upcoming deadlines. To make apply easier, it will automatically carry your inform one application to the next, saving you time ha reenter it.

[ Get a Personalized Checklist > ]

Step 1: Apply for Government Aid

Before you apply for a government loan, you sho

- Sent in your Free Application for Federal as possible. More info
- Received an Award Letter from the school After completing the above, apply for the loa Federal Subsidized Stafford Loan
Federal Subsidized Stafford Loans are amon government pays the interest on the loan w based and is communicated to the student t Who It's For: Eligible students looking to Federal Unsubsidized Stafford Loan
Federal Unsubsidized Stafford Loans, like available. However, the government does no the option to pay the interest during scho graduation.

Who It's For: Eligible students looking to

MATCH TO FIG. 5B

Fig. 5A

Sign In
                                            Contact Us: 1-800-555-4932

Image Banner                            | Federal Subsidized
:, this guide                                                               | Federal Subsidized
ning the                                                                    | government pays th
site allows                                                                 | based and is commu
t helpful
ing even                                                                    | Who It's For: Elig
ation over from
ving to                                                                     | • Lower interest
                                                                            | • Maximum of $3,5
                                                                            | • No payments whi
                                                                            | • No penalty for
                                                                            | • No application
uld already have:                                                           | • This loan is se
Student Aid (FAFSA) as soon after January 1st                               | • This loan is ba
                                                                            | • Note: The terms
you plan to attend. More info                                               |   does not pass o
ns outlined in your Award Letter.
                                                       6.8% APR             | Federal Unsubsidiz
g the most economical loans available, because the                          | Unsubsidized Staff
hile you are in school. Eligibility for this loan is need                   | available. However
hrough their school's Financial Aid Award letter.                           | the option to pay
                                                                            | graduation.
attend College half-time or more (6 or more credit hours)
                                                                            | Who It's For: Elig
                              [ Show Details ] [ Apply ]
                                                                            | • Lower interest
                                                       6.8% APR             | • Interest can be
Subsidized Stafford Loans, have one of the lowest rates                     | • Maximum of $3,5
t pay the interest while you are in school. You have                        | • No penalty for
ol or allow it to accumulate and then begin payment after                   | • No application
                                                                            | • This loan is se
                                                                            | • This loan is ba
attend College half-time or more.                                           | • Note: The terms
                                                                            |   does not pass o
                              [ Show Details ] [ Apply ]

MATCH TO FIG. 5A (left) / MATCH TO FIG. 5C (right)

*Fig. 5B*

| Stafford Loan                                                                 6.8% APR Stafford loans are among the most economical loans available, because the
e interest on the loan while you are in school. Eligibility for this loan is need
nicated to the student through their school's Financial Aid Award letter.

ible students looking to attend College half-time or more (6 or more credit hours)

rates than private loans (6.8%)
00 your first year in school
le enrolled half-time or more
early repayment
fee
cured in the student's name only
cked by the Federal Government and does not require a co-signer
and cost of this loan are set by the Federal Government. National City
n any additional costs.

(Hide Details) (Apply)

MATCH TO FIG. 5B ed Stafford Loan                                                              6.8% APR ord Loans, like Subsidized Stafford Loans, have one of the lowest rates
, the government does not pay the interest while you are in school. You have
the interest during school or allow it to accumulate and then begin payment after ible students looking to attend College half-time or more rates than private loans (6.8%)
paid during school or allowed to accumulate until you graduate
00 your first year in school
early repayment
fee
cured in the student's name only
cked by the Federal Government and does not require a co-signer
and cost of this loan are set by the Federal Government. National City
n any additional costs.

(Hide Details) (Apply)

*Fig. 5C*

Payment begins:

Full Deferal ▽

Interest rate: 6.25%

Pay loan off over: 10 years

Disclosures

Federal Parent PLUS Loan

Parent PLUS Loans allow the parents
the Expected Family Contribution in

Who It's For: Parents of college st
cost alternative to private loans an

Step 2: Apply for Private Loans

- Use private student loans to pay the rema
  (EFC) and bridge the gap between your fin
- Private student loans, such as the Nation
  you to take out as much money as you need.

National City Undergraduate Loan

The National City Undergraduate Loan offer
governmenremainder of their Expected Famil Who It's For: Parents of college students
for the entire life of the loan; Credit-wo ☞ If after filling this application ou
better interest rate, we will provid

MATCH TO FIG. 6B

Fig. 6A

US Loan                                              Fixed 8.5% APR
allow the parents of college students to cover the remainder of the Expected
on in a cost-effective way.

ents of college students without perfect credit that want a lower cost alternative
and are willing to co-sign for the life of the loan.

.5% over the length of the loan for all qualified applicants.
r rates lower than most private loans especially for individuals without
scores.
not based on financial need
paid during school or allowed to accumulate until you graduate
penalty
fee
cured in the student's and parent's name
-sign on a PLUS loan for the life of the loan
and cost of this loan are set by the Federal Government. National City
n any additional costs.

(Hide Details) ( Apply )

rgraduate Loan                                       As low as 7.6% APR
Undergraduate Loan offers a flexible way for parents or students to cover the
Expected Family Contribution.

ents of college students with excellent credit or those who do not want to co-sign
e of the loan; Credit-worthy students who do not wish to have a co-signer.

ling this application out, we determine that the Parent PLUS Loan will offer a
est rate, we will provide you the opportunity to switch.

ble and, depending on credit score, can be lower than the Parent PLUS
ge from 7.65% to 11.74% depending on credit worthiness of co-signer on is not required to apply
paid during school or allowed to accumulate until you graduate
ffer parents the option of releasing their co-signature after 3 years of on-time tudents may secure this loan without a co-signer
early prepayment
in as little as 7 business days (Hide Details) ( Apply )

*Fig. 6C*

National City®

Home

Planning for College

Financing Education

Student Loan Application Guide

Consolidate Loans

My Account

02/04/2008 - Your Federal Stafford Loan was approved and funds will be sent to the school 3 days prior to the first day of classes.

( View My Accounts > )

Student Aid Specialist
1-800-555-5097

My Account
Consectetuer adipiscing eit, sed diam n
wisi enim ad minim veniam, quis nostrud
Duis autem vel eum inure dolor in hendr
facilisis et vero eros et accumsan et i

| Application History | My |

You have applied for:

√ Federal Subsidized Stafford Loan

Other Applicable Student Loans:

Federal Unsubsidized Stafford Loan

Federal Parent PLUS Loan

National City Undergraduate Loan

MATCH TO FIG. 7B

*Fig. 7A*

Sign In

Contact Us: 1-800-555-4932 onummy nibh euismod tincdunt ut lacreetdolore magna aiquam erat volutpat. Ut
exerci tation ullamcorper suscipit lobortis nisl ut aliquip ex ea commodo consequat.
ent in vulputate velit esse malestie consequat. vel illum docre eu feugiat nulla
usto odio dignissim qui blangit praesent uptatum.

| Award Letter | Account Information |

Status:

Under review by National City            (Show Details)

Information from your other applications will carry over.

79% of into will pre-fill        (Show Details) (Apply Now >)
79% of into will pre-fill        (Show Details) (Apply Now >)
34% of into will pre-fill        (Show Details) (Apply Now >)

MATCH TO FIG. 7A

*Fig. 7B*

National City

Home

Planning for College

Financing Education

Student Loan Application Guide

Consolidate Loans

My Account

02/04/2008 - Your Federal Stafford Loan was approved and funds will be sent to the school 3 days prior to the first day of classes.

[ View My Accounts > ]

Student Aid Specialist
1-800-555-5097

My Account

Consectetuer adipiscing eit, sed diam n
wisi enim ad minim veniam, quis nostrud
Duis autem vel eum inure dolor in hendr
facilisis et vero eros et accumsan et i

| Application History | My |

You have applied for:

✓ Federal Subsidized Stafford Loan

Other Applicable Student Loans:

Federal Unsubsidized Stafford Loan

Federal Parent PLUS Loan

Federal Subsidized Stafford loans the interest on the loan while yo to the student through their scho Who It's For: Eligible students

- Lower interest rates than private
- Maximum of $3,500 your first year
- No payments while enrolled half-t
- No penalty for early repayment
- No application fee
- This loan is secured in the stude
- This loan is backed by the Federa
- Note: The terms and cost of this does not pass on any additional c National City Undergraduate Loan

MATCH TO FIG. 8B

*Fig. 8A*

Sign In

Contact Us: 1-800-555-4932 onummy nibh euismod tincdunt ut lacreetdolore magna aiquam erat volutpat. Ut exerci tation ullamcorper suscipit lobortis nisl ut aliquip ex ea commodo consequat. ent in vulputate velit esse malestie consequat, vel illum docre eu feugiat nulla usto odio dignissim qui blangit praesent uptatum.

| Award Letter | Account Information |

Status:

Under review by National City   (Show Details)

Information from your other applications will carry over.

79% of into will pre-fill   (Show Details) (Apply Now >)

79% of into will pre-fill   (Hide Details) (Apply Now >)

are among the most economical loans available, because the government pays u are in school. Eligibility for this loan is need based and is communicated ol's Financial Aid Award letter.

looking to attend College half-time or more (6 or more credit hours)

loans (6.8%)
in school
ime or more nt's name only
l Government and does not require a co-signer
loan are set by the Federal Government. National City
osts.

34% of into will pre-fill   (Show Details) (Apply Now >)

MATCH TO FIG. 8A

*Fig. 8B*

National City

Home

Planning for College

Financing Education

Student Loan Application Guide

Consolidate Loans

My Account

02/04/2008 - Your Federal Stafford Loan was approved and funds will be sent to the school 3 days prior to the first day of classes.

View My Accounts >

Student Aid Specialist
1-800-555-5097

My Account
Consectetuer adipiscing eit, sed diam n
wisi enim ad minim veniam, quis nostrud
Duis autem vel eum inure dolor in hendr
facilisis et vero eros et accumsan et i

| Application History | My |

Ready to renew your loans?

The loans you applied for last yea
award letter and click "Apply for

The loans you applied for last year:

Federal Unsubsidized Stafford Loan

Federal Parent PLUS Loan

National City Undergraduate Loan

MATCH TO FIG. 9B

Previous Year's Loans:

2007   Federal Unsubsidized Stafford L

2007   Federal Parent PLUS Loan

2007   National City Undergraduate Lo

*Fig. 9A*

Sign In

Contact Us: 1-800-555-4932 onummy nibh euismod tincdunt ut lacreetdolore magna aiquam erat volutpat. Ut exerci tation ullamcorper suscipit lobortis nisl ut aliquip ex ea commodo consequat. ent in vulputate velit esse malestie consequat, vel illum docre eu feugiat nulla usto odio dignissim qui blangit praesent uptatum.

| Award Letter | Account Information | r are listed below. Fill in the loan amounts from your financial aid All" to apply for all of next year's loans.

This year's loan amounts:

$ [          ]         ( Apply Now > )

$ [          ]         ( Apply Now > )

$ [          ]         ( Apply Now > )

( Re-Apply For All Loans > )

|       | Fall    | Spring  |
|-------|---------|---------|
| oan   | $1,200  | $1,300  |
|       | $8,000  | $9,000  |
| an    | $4,000  | $4,000  |

MATCH TO FIG. 9A

*Fig. 9B*

National City

Home

Planning for College

Financing Education

Student Loan Application Guide

Consolidate Loans

My Account

02/04/2008 - Your Federal Stafford Loan was approved and funds will be sent to the school 3 days prior to the first day of classes.

[ View My Accounts > ]

Student Aid Specialist
1-800-555-5097

My Account
Consectetuer adipiscing eit, sed diam n
wisi enim ad minim veniam, quis nostrud
Duis autem vel eum inure dolor in hendr
facilisis et vero eros et accumsan et i

| Application History | My |

Total Cost of School:
  Total Yearly Cost of College

Enter the loans in your award lett
  Expected Family Contribution

Scholarships

Grants

Work Study

Federal Loans (Stafford/Perkins)

Federal Loans (Parent PLUS/Gradu

School Loans

Bank Loans

Total Financial Aid
      Total Free Money
      Total Work Study
      Total Low-Interest Loans
      Additional Loans
  Additional Savings Required
  Total Yearly Cost of School

MATCH TO FIG. 10B

*Fig. 10A*

Sign In
Contact Us: 1-800-555-4932 onummy nibh euismod tincdunt ut lacreetdolore magna aiquam erat volutpat. Ut exerci tation ullamcorper suscipit lobortis nisl ut aliquip ex ea commodo consequat. ent in vulputate velit esse malestie consequat, vel illum docre eu feugiat nulla usto odio dignissim qui blangit praesent uptatum.

| Award Letter | Account Information |

$ [16500]

MATCH TO FIG. 10A er:

ate PLUS)

| Awarded Amount: | | Amount Taken: |
|---|---|---|
| $ [2700] | | $ 2700 |
| $ [1800] | ⎯⎯⎯▶ | $ [1800] |
| $ [4000] | ⎯⎯⎯▶ | $ [4000] |
| $ [1500] | ◀⎯⎯⎯ | $ [0] |
| $ [3000] | ⎯⎯⎯▶ | $ [3000] |
| $ [3000] | ⎯⎯⎯▶ | $ [3000] |
| $ [0] | | $ [0] |
| $ [0] | | $ [0] |
| $ 16,500 | | $ 14,500 |
| $ 8,500 | | $ 8,500 |
| $ 1,500 | | $ 0 |
| $ 3,000 | | $ 3,000 |
| $ 3,500 | | $ 3,500 |
| $ 0 | | $ 2000 |
| $ 16,500 | | $ 16,500 |

*Fig. 10B*

National City®

Home

Planning for College

Financing Education

Student Loan Application Guide

Consolidate Loans

My Account

02/04/2008 - Your Federal Stafford Loan was approved and funds will be sent to the school 3 days prior to the first day of classes.

( View My Accounts > )

Student Aid Specialist
1-800-555-5097

My Account
Consectetuer adipiscing eit, sed diam n
wisi enim ad minim veniam, quis nostrud
Duis autem vel eum inure dolor in hendr
facilisis et vero eros et accumsan et i

| Application History | My |

My Account Settings:

Personal Information [Edit]

John Doe john.doe@gmail.com

Email Address:

A Temporary Password Was Email
　Change my Password

MATCH TO FIG. 11B

*Fig. 11A*

Sign In

Contact Us: 1-800-555-4932 onummy nibh euismod tincdunt ut lacreetdolore magna aiquam erat volutpat. Ut exerci tation ullamcorper suscipit lobortis nisl ut aliquip ex ea commodo consequat. ent in vulputate velit esse malestie consequat, vel illum docre eu feugiat nulla usto odio dignissim qui blangit praesent uptatum.

| Award Letter | Account Information |

Communication Preferences [Edit]

Email me when my loan status changes

Do not email me with alerts of upcoming financial aid deadlines ed to You

MATCH TO FIG. 11A

*Fig. 11B*

COMPUTER-IMPLEMENTED SYSTEMS AND METHODS FOR STUDENT LOAN APPLICATION PROCESSING

CROSS-REFERENCE TO RELATED APPLICATION

This application claims priority to and the benefit of U.S. Provisional Application Ser. No. 61/100,978, (entitled "Computer-Implemented Systems and Methods for Student Loan Application Processing" and filed on Sep. 29, 2008), of which the entire disclosure (including any and all figures) is incorporated herein by reference.

TECHNICAL FIELD

This document relates generally to student loan application processing and more particularly to computer-implemented systems and methods for student loan application processing.

BACKGROUND

The student loan industry is characterized as a public/private partnership. On the public side legislators at both the federal and state levels regulate the industry with the goal of determining the "financial need" of students. On the private side, banks and lending institutions satisfy students' financial need by marketing a series of incremental student loan products.

There are many types of student loans products that are available to students with financial need. Some of these products are regulated by the Department of Education and insured by the government. Some of these products are also regulated and insured by private banks.

Once the financial need of a student/family has been assessed, students are awarded a financial aid package from prospective schools. A financial aid package will include scholarships (that do not have to be paid back) and student loans (which do have to be paid back). Often the loan portion of the financial aid package will include loan offerings from both the government pool of loans and the banking industry pool of loans. Consequently, students are required to fill out multiple loan applications to secure the various loans.

SUMMARY

In accordance with the teachings provided herein, systems and methods for operation upon data processing devices are provided to facilitate the applying of student loans. For example, a computer-implemented system and method can include graphical user interfaces for providing a series of questions to a user which relate to the applying of the student loans. At least a majority of the questions are provided to the user without reference to any specific student loan application. The responses are used to populate multiple different student loan applications.

As another example, a computer-implemented system and method can be configured to generate a plurality of graphical user interfaces for display on a computer display device to a user. The plurality of graphical user interfaces provide a series of questions to the user which relate to the applying of the student loans. The plurality of graphical user interfaces are configured to capture responses from the user to the series of questions. At least a majority of the questions are provided to the user without reference to any specific student loan application. The responses captured by the plurality of graphical user interfaces are stored in a common data structure. The common data structure is stored on a computer-readable storage medium. Multiple different student loan applications are populated based upon the responses stored in the common data structure. The populated multiple different student loan applications are submitted for approval.

BRIEF DESCRIPTION OF THE DRAWINGS

FIGS. 2-11 depict a series of user interfaces that help guide the user through the student loan application process.

DETAILED DESCRIPTION

Figure 1:
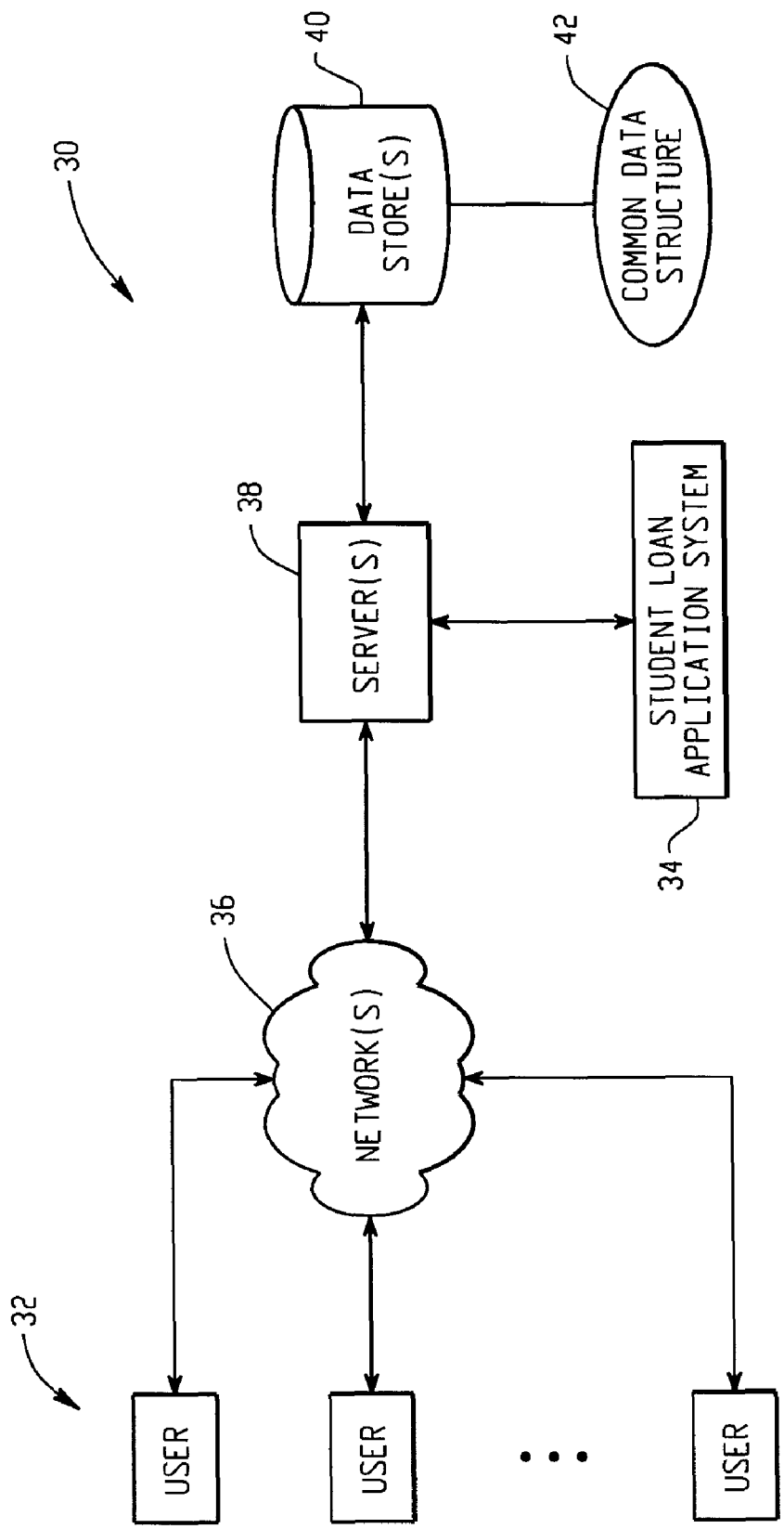
FIG. 1 is a block diagram depicting a student loan application system.
Figure 2B:
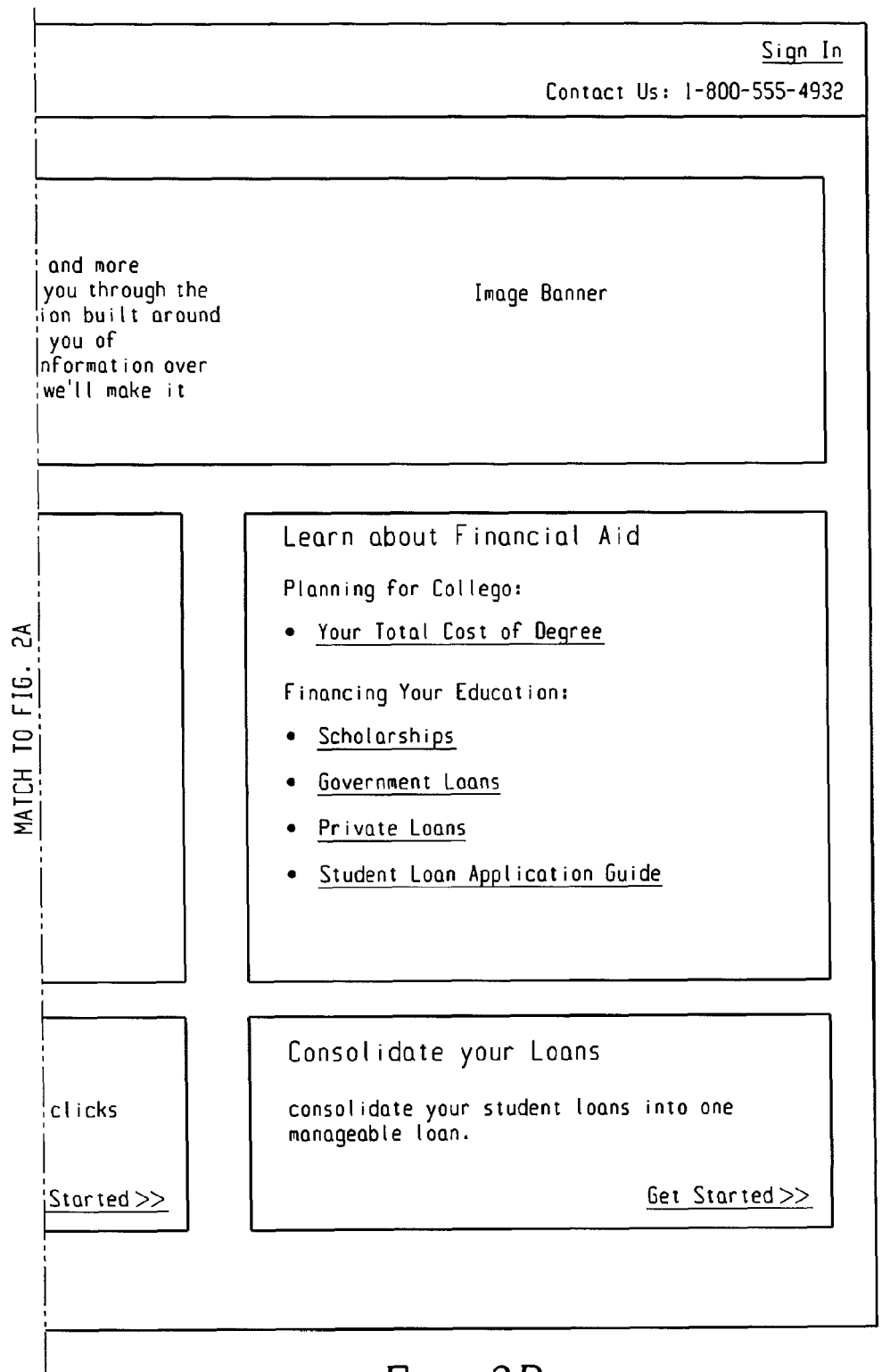
Figure 6B:

FIG. 1 depicts at 30 an environment wherein users 32 can interact with a student loan application system 34. The system 34 guides a user (e.g., a student, the student's guardian or parent, etc.) through the process of obtaining the funds that are needed for the college of choice. The system 34 presents loan applicants with a method to centralize various loan application data. The system 34, by including web interface and electronic data processing, helps students aggregate various types of required loan application data in one central repository 40. Centralizing various loan application data helps create a unique and industry specific application experience that ultimately reduces or eliminates high levels of customer purchase anxiety by circumventing the fragmented nature of the loan application process.

The users 32 can interact with the system 34 through a number of ways, such as over one or more networks 36 (e.g., Internet network, WANs, LANs, etc.). Server(s) 38 accessible through the network(s) 36 can host the system 34. One or more data stores 40 can store the data to be analyzed by the system 34 as well as any intermediate or final data generated by the system 34. The system 34 can be a web-based tool that provides users flexibility and functionality for performing student loan-related operations.

As an example of a web-based implementation, FIGS. 2-11 depict a series of user interfaces that help guide the user through the student loan application process. The figures illustrate the wide scope of information that is presented to the user as well as the information that the system asks the user to provide. As shown in the user interfaces of these figures, even though multiple different loan applications are being addressed (e.g., Federal Subsidized Stafford Loan, Federal Unsubsidized Stafford Loan, private bank loan(s), etc.), the system maintains a continuity of appearance and message between various application procedures, application websites, and also provides a secure connection between websites, and assists in fostering business partnerships.

Through web-based user interfaces (e.g., the interface 100 on FIG. 2), the system presents to the user a series of questions in order to acquire from the user the needed information that is to be stored in a common data structure (as shown at 42 in FIG. 1). From the common data structure, multiple different student loan-related applications can be populated since the items that are common to the applications have been identified by the system and are captured and stored in the common data structure.

This approach reflects a consumer behavior model since, inter alia, the system is designed to provide a complete solution to what the customer actually wants. This is further exemplified in that the system, the common data structure, and the common nucleus of questions presented to the user are designed by working backwards from the needs of the consumer and their behavior. This approach also reduces the amount of effort by the user to complete student loan applications because the user only has to enter the information once in order to satisfy the approval criteria of multiple different loan applications.

Determining which specific questions to ask can be based upon analyzing the actual questions posed in a more detailed loan application such as an application for a private loan from a bank. The set of questions can be further expanded by examining the information needed to satisfy the qualifying criteria of other applications (e.g., federally-based applications). This can yield additional data points to be gathered from the user.

The series of questions to populate the common data structure can vary based upon the initial information provided by a user, such as whether the student wishes to pursue a private school or a public school. Although the series of questions may vary to a degree, the primary set of questions is established based upon demographic and transaction-related (e.g. financial-related) information that forms the loan approval criteria for multiple student loan applications.

The student loan applications that can be populated based on the data stored in the common data structure include several different tiers of loan applications, such as a federal tier of loan applications and a private bank tier of loan applications. Because of utilization of the common data structure for multiple applications, the user is required only to enter information once up-front to satisfy the loan approval criteria for such multiple applications.

To reduce the number of questions posed to a student, a profile of the student can be dynamically generated based upon any pre-existing information about the student as well as information that is captured while the student is interfacing with the system. As an illustration, if the user specifies that they are an undergraduate student applying for a public school, then this user-provided information can change the common nucleus of questions that are presented to the user because typically the federally-based loans are sufficient for a person attending a public school. The altered common nucleus of questions in this situation would satisfy the qualifying loan criteria for the federally-based loans. For more expensive type schools (e.g., private schools), the common nucleus of questions could be expanded to satisfy the qualifying loan criteria for both the federally-based loans as well as private-based loans. However, it should be understood that a student who is attending a public school still has access within the system to apply for private-based loans if needed, and any information (that has already been provided to the system and which is stored in the common data structure) will automatically be used to pre-populate/pre-load any fields for private-based loans.

As another example for reducing the number of questions, the system can determine which applications the student is probably most interested in and provide the set of questions to the user that will satisfy the loan qualifying criteria associated with those applications. The system can determine such applications a priori in many different ways, such as based upon which school the student has expressed an interest in. The student can also directly specify for which one or more loan applications a user wishes to apply. A user can enter into the system any financial information (e.g., scholarship amounts, grant amounts, etc.) into the system that has been provided by a financial aid award letter. The system can then automate the process for the user to apply for the desired loans.

As another example to reduce the number of questions, questions that are not absolutely needed to satisfy the loan approval criteria (e.g., questions that are more directed to obtaining information from the user for marketing purposes: "how did you hear about us," etc.) are removed from the common nucleus of questions that are asked of the user.

The initial set of questions posed to the student can include asking the student about which school the student is interested in, the state in which the school is located, and the type of program (e.g., undergraduate, graduate, etc.) to be pursued. The system then can ask how the user wishes the loans be treated (e.g., whether they are to be deferred while the student is in school) since that drives the financial results later in the process (e.g., with respect to accruing interest). Additional questions are directed to acquiring information to complete the loan that is least expensive (i.e., the loan which is the most beneficial to the student from a financial standpoint).

It is noted that the system can be operated by a bank that provides private loans to students and can be configured such that the least expensive loan(s) are prioritized first (e.g., the Federal Subsidized Stafford Loan is prioritized first, then the following loans: Federal Unsubsidized Stafford Loan, Federal Parent PLUS Loan, private bank loan(s)). Federal Subsidized and Unsubsidized Stafford loans can be considered the most economical loans available since, inter alia, depending on the student's financial need, the government will even pay the interest on the loan while the student is in school.

The system can be configured to ask around 130 data points whose responses are stored in a common data structure for multiple purposes, such as for determining which loan solution works best for the student, and for providing the content needed to complete multiple loan applications. Each of the applications can be federally-based or privately-based—in other words, the common data structure can be used to populate both federally-based loan applications and privately-based loan applications.

Still further, the system can be configured to not ask questions about information which can be derived from external sources. For example, based upon user identification information, federal or state tax information can be obtained from governmental agencies and used to pre-populate the common data structure or at least be used to not ask the questions and allow a third party (e.g., for security reasons) to complete the application process using the student's tax information. Other sources can include leveraging information already provided with respect to FAFSA (Free Application for Federal Student Aid).

Although the entire set of questions is directed to obtaining information necessary to satisfy multiple different loans, the order of the questions can be structured so as to satisfy the basic requirements of the least expensive loan first. In this way, if the user breaks off from the series of questions, the student may have answered enough questions to start the processing of the least expensive loan first. However, it should be understood that the system can be configured in many different ways with respect to how the information is acquired from the user. As an illustration, the system can be configured to require the user to answer all questions before the loan application processing phase begins.

As another illustration, the system can be configured to ask the user a sufficient number of questions to at least satisfy the least expensive loan's qualifying criteria and then provide one or more statistics about how much more information is needed to complete the other loan applications. Along with providing the statistics, the user can be prompted as to whether additional financial assistance is needed beyond the loans that have been specified thus far. If the user indicates this, then the system can utilize the information that is already stored in the common data structure (which had been obtained from the user through the prior questions), thereby removing the need to ask the user for this information again. For example, the system may indicate that 65% of the information that is needed for a second loan application has already been acquired from the user previously providing information about one or more other loans. Accordingly, the user needs to only supply an additional 35% of the information to complete the second loan application. Correspondingly, if the user wishes to apply for a third application, the information that has already been provided for the first two loan applications and which information is stored in the common data structure can be used directly in the third application without any further prompting from the user. As an additional example, see FIG. 7 wherein the information from other application(s) (e.g., a Federal Subsidized Stafford Loan) will carry over to the other applications in the following amounts:

79% of the information will pre-fill the Federal Unsubsidized Stafford Loan

79% of the information will pre-fill the Federal Parent PLUS Loan

34% of the information will pre-fill the National City Undergraduate Loan

As mentioned above, components of the system (e.g., the common data structure, the user interfaces, etc.) can be developed through a behavior driven approach. This approach reflects the fact that the goal of the student is not to complete an application, but rather to attend the school of his or her choice. Accordingly, the system is designed to solve for the complete financial aid award process, thereby addressing the overall need of allowing the student to attend school. By solving for the entire financial need (versus merely solving for an incremental loan), this helps eliminate redundant noise that may exist among the applications and allows the user to have to only once focus on providing the necessary information for completing applications across both the federal and private banking tiers. This common nucleus of questions solves for what is the required data set for most people to fulfill all of their financial needs with respect to federally-based loans and privately-based loans.

As an illustration, a user can enter information into the system about any scholarships that the school has provided to the student as well as enter information for satisfying loan approval criteria. Based upon this information, the system provides a complete solution that includes loan data and approval information not only for a federally-based type loan, but also if needed for the solution, such information for other federally-based type loans and private-based type loans.

Because the user has already provided upfront the essential loan qualifying criteria for the different applications, the user does not have to be bothered with additional details to apply for additional loans. Rather, after the initial information gathering phase has been completed, the user can merely select which loan applications the student wishes to submit. This removes the difficulty of a user having to handle incremental loans because the data in the common data structure can be used in the waterfall of potential loans. In addition, the system can be extended to include using the previously gathered information to complete not only student loan applications, but also other financial products, such as, credit card applications, car loan applications, etc. This approach is holistic since the data is being gathered not for one particular application, but for potential use in multiple different applications for different purposes.

As an additional feature that can be used within the system, the system can automate the loan application process if desired to essentially remove the upfront decision-making process from the user, and allow the system to provide as options one or more loans (which can be federally-based loans and/or private bank loans) to the user such as by prioritizing the loans based upon what is best to the student from a financial standpoint (e.g., the least expensive loan being recommended first).

The system may alter the questions or the manner in which they are presented. For example, a particular private school may wish to present different data to the student as a student progresses through the question-and-answer process, such as presenting tuition charges that are specific to the school. The school-specific information provides a benefit over previous approaches that only provide predetermined non-specific loan information The common data structure stores information that is not only relatively independent of the different applications, but also is used for providing end-to-end processing capability so as to provide a complete solution for the student's needs. The end-to-end processing capability is further shown in that the common data structure handles the data received from the user and is then used as part of the communication pathway with other third parties, such as PHEAA or Great Lakes.

An implementation of the student loan application system can include utilization of Web 2.0 technology in order to facilitate the customization of user interfaces. This can be helpful in customizing the user interfaces based upon the different types of information that schools may wish to show.

The customization may also extend to customizing the process flow associated with acquiring the information up front from the user. For example, a particular process flow can be used for a first school, and a different process flow for acquiring the information can be used if the user selects a different school. The process flow for the first school may show detailed information (e.g., providing PDF documents) about how to be responsible with respect to the payment obligations associated with the loans the students are applying for, whereas the process flow for the second school may not require such information. Instead the second school may wish to customize its process flow by showing more details about its tuition charges and whether its school year is on a semester, trimester or quarterly basis.

The information for a user that is in the common data structure is preserved over time in order to create a historical set of records. The historical information assists the user when the user wishes to renew their application in a subsequent year. This provides users with not only a time trend analysis of their loan application financial history but also allows them to see how they paid for earlier terms (e.g., to view their historical loan data associated with their freshman year and sophomore year when they are seeking financial aid for their junior year). (See FIG. 9 wherein a student's 2007 loan information is displayed.) Additionally, the system uses the information in the common data structure to pre-populate fields within the application or applications that are to be renewed. After the user has reviewed this information that has been derived from information in the common data structure, the user can click submit and the applications are then automatically processed by the system and sent out to a partner (e.g. PHEAA, Great Lakes, etc.).

The common data structure is also relatively independent of the information requirements of any partners (e.g., PHEAA, Great Lakes, etc.) that are part of the student loan process. The different partners typically exchange data that not only differs in format but also in content. A plug-in is created in the system for each of the partners in order to provide conversion of the data from the common data structure into the format and content that each partner uses as part of its data exchange mechanism. With such an approach, the end-to-end processing (i.e., from the user to the partners) can be automated.

Figure 12:
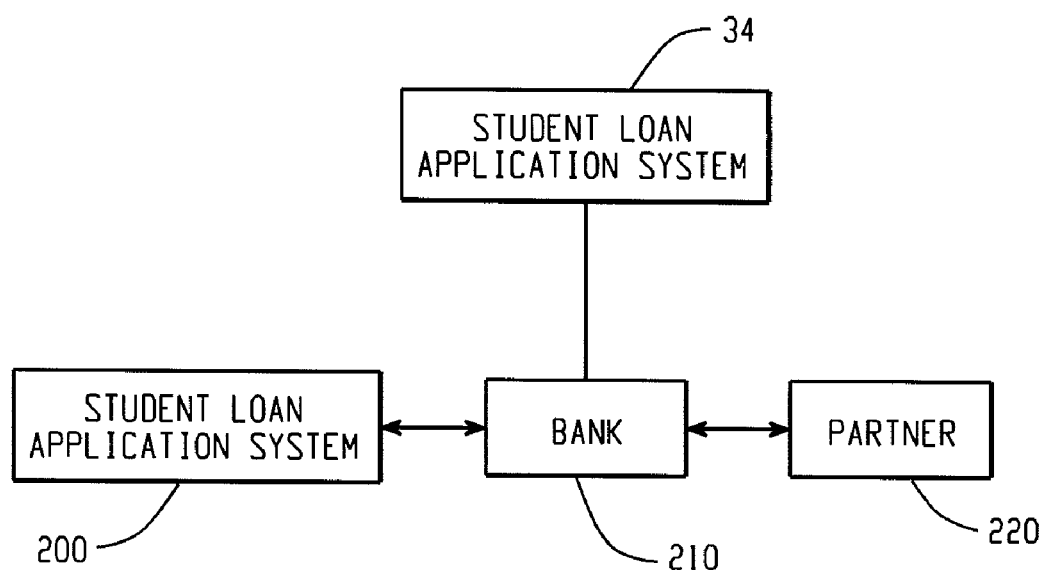
FIGS. 12 and 13 are block diagrams providing non-limiting examples of data communications involving a partner.
Figure 13A:
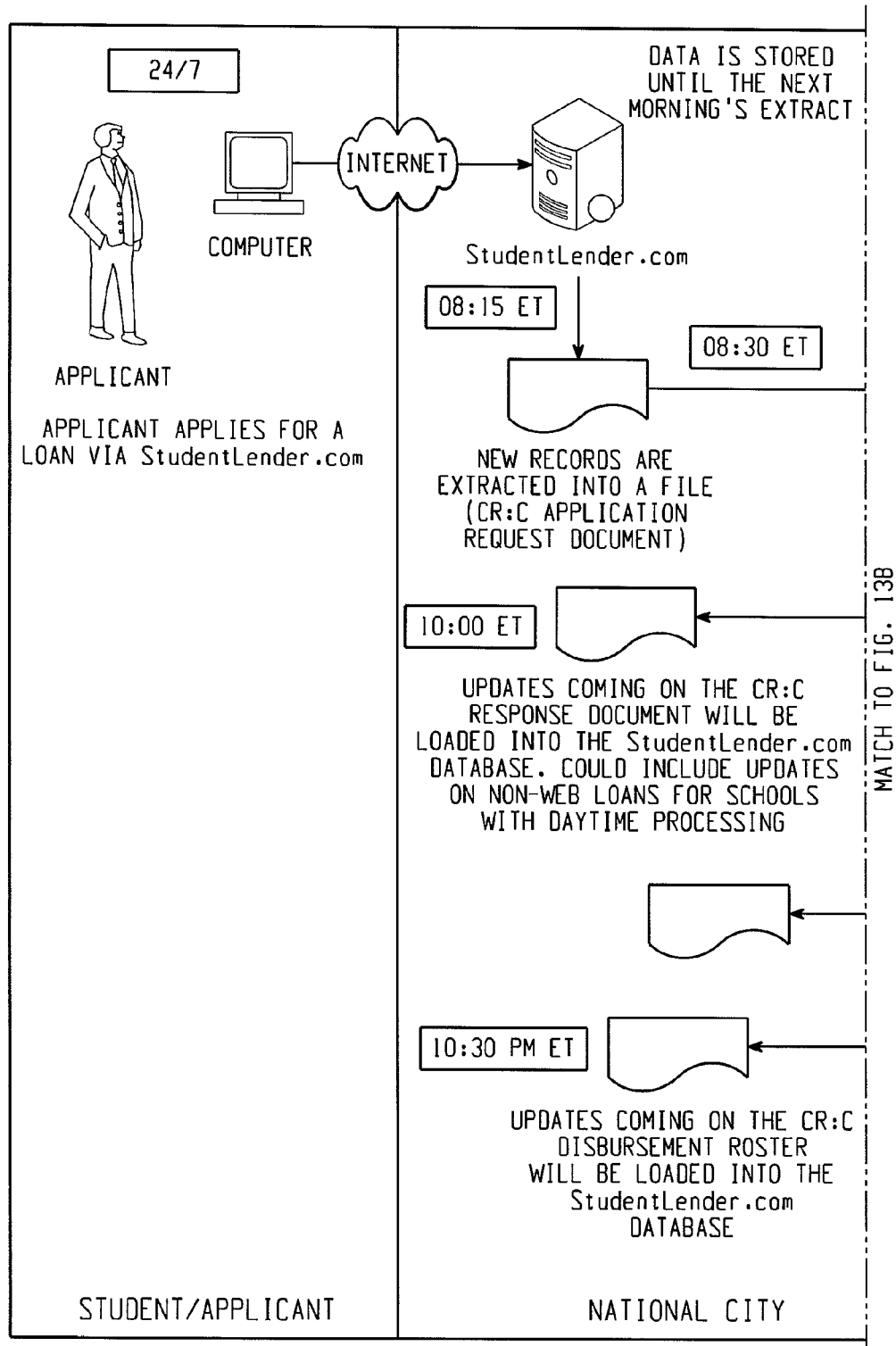
Figure 13B:
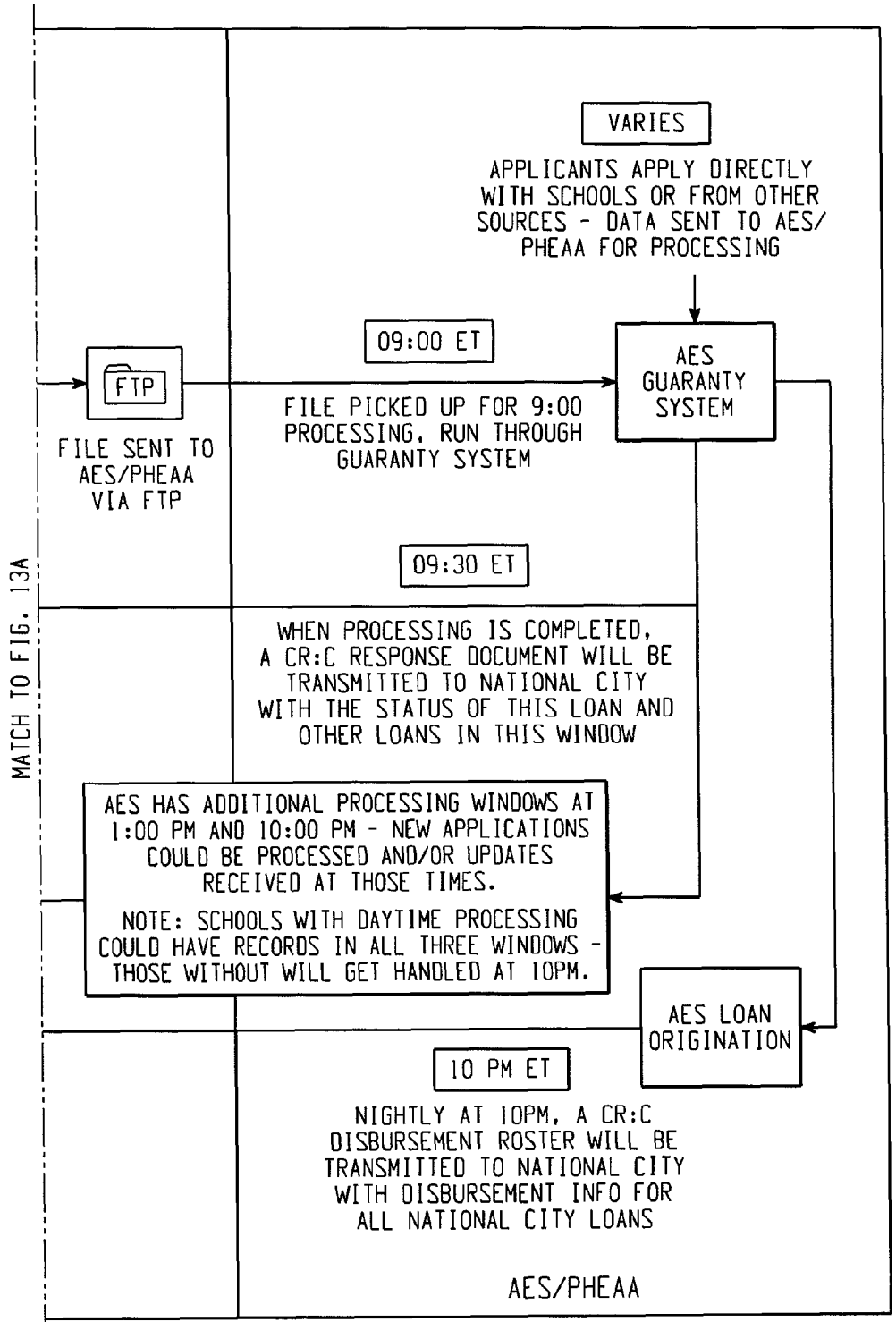

After the user has specified the prerequisite information for the desired loans, the system uses the information stored in the common data structure to populate the file to send to the partner. The system additionally packages the information into a format that is acceptable to a partner (e.g. PHEAA, Great Lakes, etc.). The partner will then process the loan and return its loan processing results. FIGS. 12 and 13 provide non-limiting process flow examples of data communications involving a student/applicant 200, a bank 210, and a partner 220.

Figure 14:
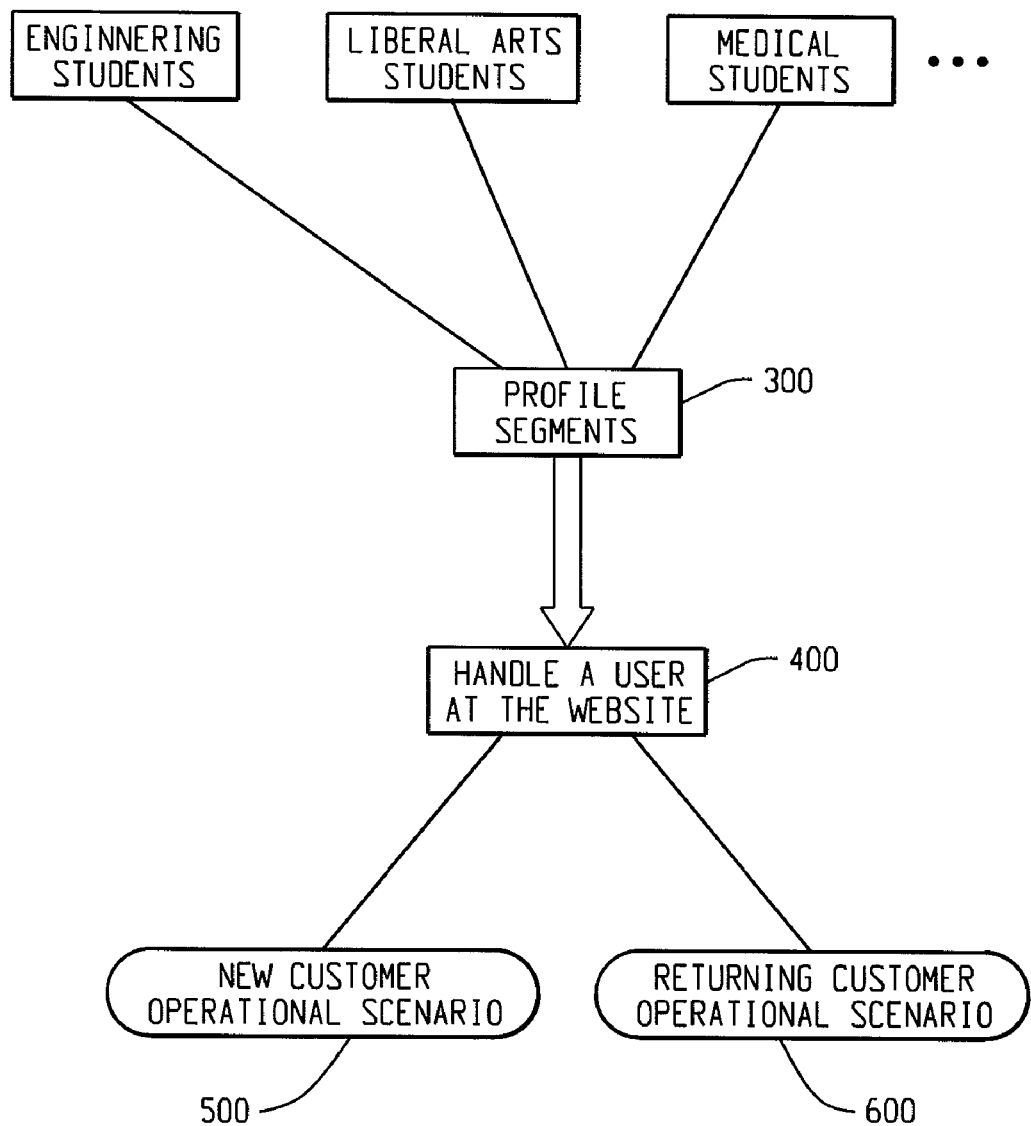
FIG. 14 is a block diagram depicting dynamic profiling operations for honing a website to an individual's specific needs.
Figure 15:
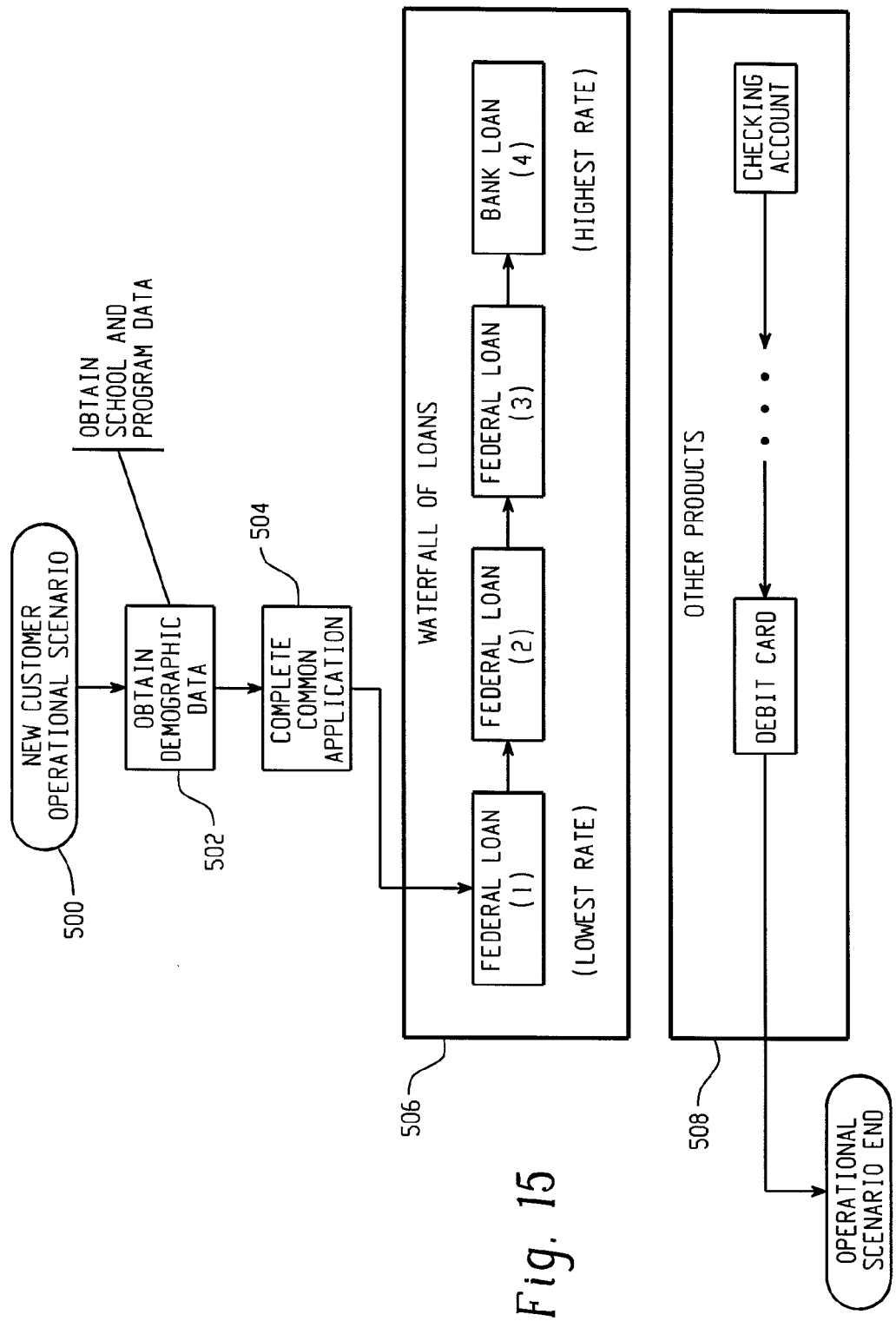
FIG. 15 is a flowchart depicting an example of dynamic profiling with respect to new users.

As shown in FIG. 14, the system can also include dynamic profiling operations in order to better hone at 400 the website to an individual's specific needs. The dynamic profiling can handle two different categories of users: new users (as shown at 500) and returning users (as shown at 600). FIG. 15 provides an example of dynamic profiling with respect to new users, such as by customizing web pages to their specific needs. First, a new user's demographic information is captured at 502 (e.g., where they are going to school, where they live, financial profile, etc.) and what field of study (e.g., major, graduate degree, etc.) they wish to pursue. This information is then matched to credit scoring data such as with credit information available from Experian or other such similar sources. The new user enters the student loan website and completes at 504 the common nucleus of questions in order to apply for one or more loans. However in this scenario, the web pages containing the questions are customized based upon the dynamic profiling of the student.

For example, based upon which school they wish to attend, the system accesses pre-existing information about what the school costs and therefore can tailor the web pages to ask questions that are to be sufficient to meet the costs of that school. In this way, the common nucleus of questions can be expanded or contracted based upon the particular type of school the student wishes to attend. Moreover, the waterfall of loans 506 is specially designed to meet the funding needs to attend that school based upon the dynamically created profile. Web 2.0 technology can be used to generate pop-up windows that provide additional information about the loans that are in the specially designed waterfall of loans or about other financial instruments 508 (e.g., a home equity loan, personal savings, etc.) for use in meeting the cost of the school.

Figure 16:
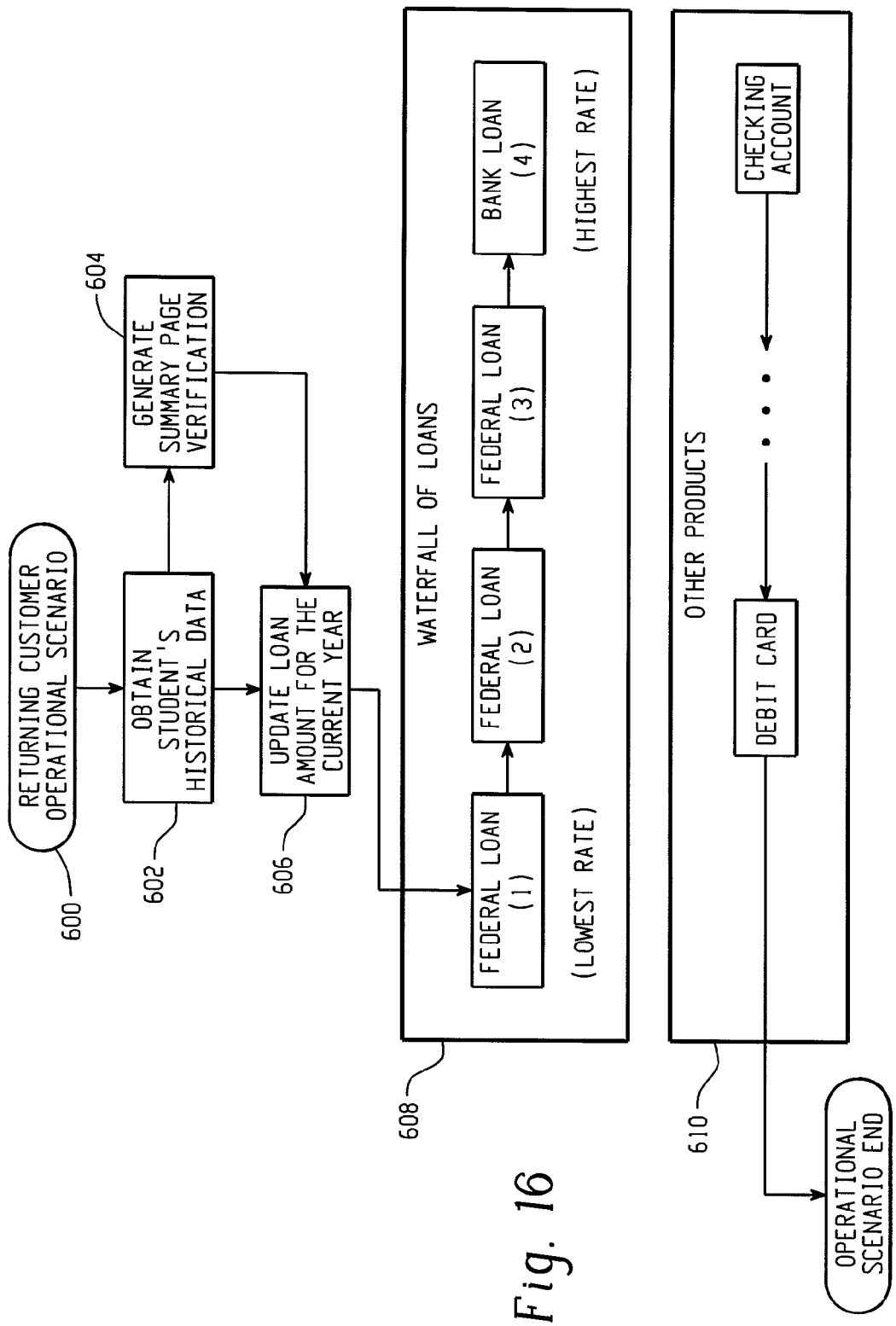
FIG. 16 is a flowchart depicting an example of dynamic profiling with respect to returning users.

FIG. 16 provides an example of dynamic profiling with respect to returning users 600. The system has already stored information about the student (e.g. demographic information, school information, credit score, etc.) and retrieves it at 602 when a user returns. Upon a user returning to the website, the system generates a summary page of information at 604 and asks the user to verify this retrieved information (or at least the most relevant portions of the retrieved information). After verification, the system pre-populates the web pages with the information that had been previously collected from the user (e.g., the loan data that was used in generating the student's previous loan(s)).

The user at this point can adjust at 606 the data in order to suit the student's current needs. Based upon the historical loan data, the user is presented with only a single screen display of the student's previous loans and loan amounts. The display inquires whether the student would like to reapply for these loans at these loan amounts or to modify the loans and/or their amounts. After the loan information (with any modifications) is submitted, the information is automatically attached with the student's pre-existing promissory notes.

As another illustration of dynamic profiling, a first student may wish to pursue an engineering degree at a public university, while a second student may wish to pursue an undergraduate liberal arts degree at a private college. The system generates a different profile for each of the students. Based upon a profile segment the user is associated with (e.g., as shown at 300 on FIG. 14), the application process and the information it collects are modified. The waterfall of loans 608 is specially designed to meet the funding needs to attend that school based upon the dynamically created profile. Web 2.0 technology can be used to generate pop-up windows that provide additional information about the loans that are in the specially designed waterfall of loans or about other financial instruments 610 (e.g., a home equity loan, personal savings, etc.) for use in meeting the cost of the school.

The profile segments and their attributes are initially generated by analyzing the historical profile data of which students attended which schools and for what types of degrees. For example, the profile segment associated with the second student mentioned above may indicate that such students in this segment are more likely to need debit cards while attending school. A possible reason for this type of segment profile is that parents can more closely monitor monetary expenditures through the debit card at the higher priced private college.

Other products can also be provided to the user based upon the dynamic profiling. Examples of products that can be automatically provided to a user based upon dynamic profiling can include a home equity student loan, a student checking account, a student credit card account, a student debit card, a 529 savings plan, etc.

The dynamic profiling is updated as additional information is collected from the user as the user or progresses through the website. Moreover, the profiling changes as the needs of the student changes. As an illustration, a user provides information to the website for obtaining student loans. However at a later time, the user may have a need to obtain a car loan such as for use while at school or at a later point in their life. The already generated student profile information is used when the user is interacting with the website regarding the car loan. Moreover, any information obtained from the student application loan process can be used to pre-populate a car loan application.

For greater appeal to customers, the website can be designed with respect to such categories as: ease of use (e.g., simplified data capture), web transaction security as well as to operate as an electronic repository of the customer's information. For example, the system can be configured to store a complete history of all student loan transactions of a student. These categories provide another mechanism for profiling a user, such as to what degree a user falls within each of the three categories (i.e., ease-of-use, security, and utilization of an electronic repository). In other words, which of the categories are the most important drivers relative to a user for the website.

Additionally with respect to the website's design, the user's interactions with the website are also captured to help assess how user friendly the website is. For example, if the system determines that a significant number of users (who are pursuing liberal arts degrees) are "dropping off" the website relative to the population of all users, this indicates that the website may be too difficult to navigate, and accordingly should be enhanced so as to improve ease-of-use.

Figure 17A:
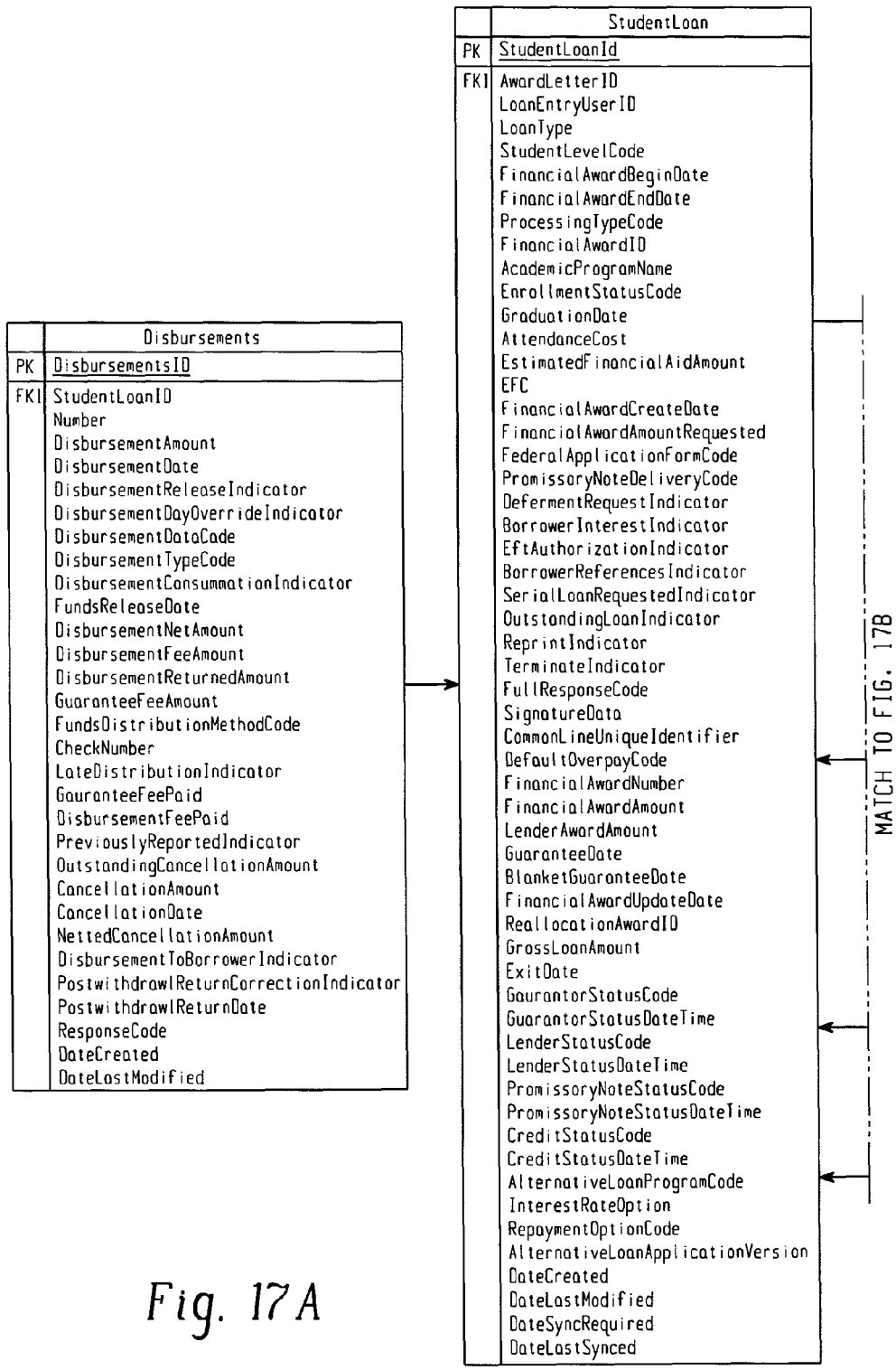
FIGS. 17A-17C depict a data structure schema for storing information in a common data structure.
Figure 17B:
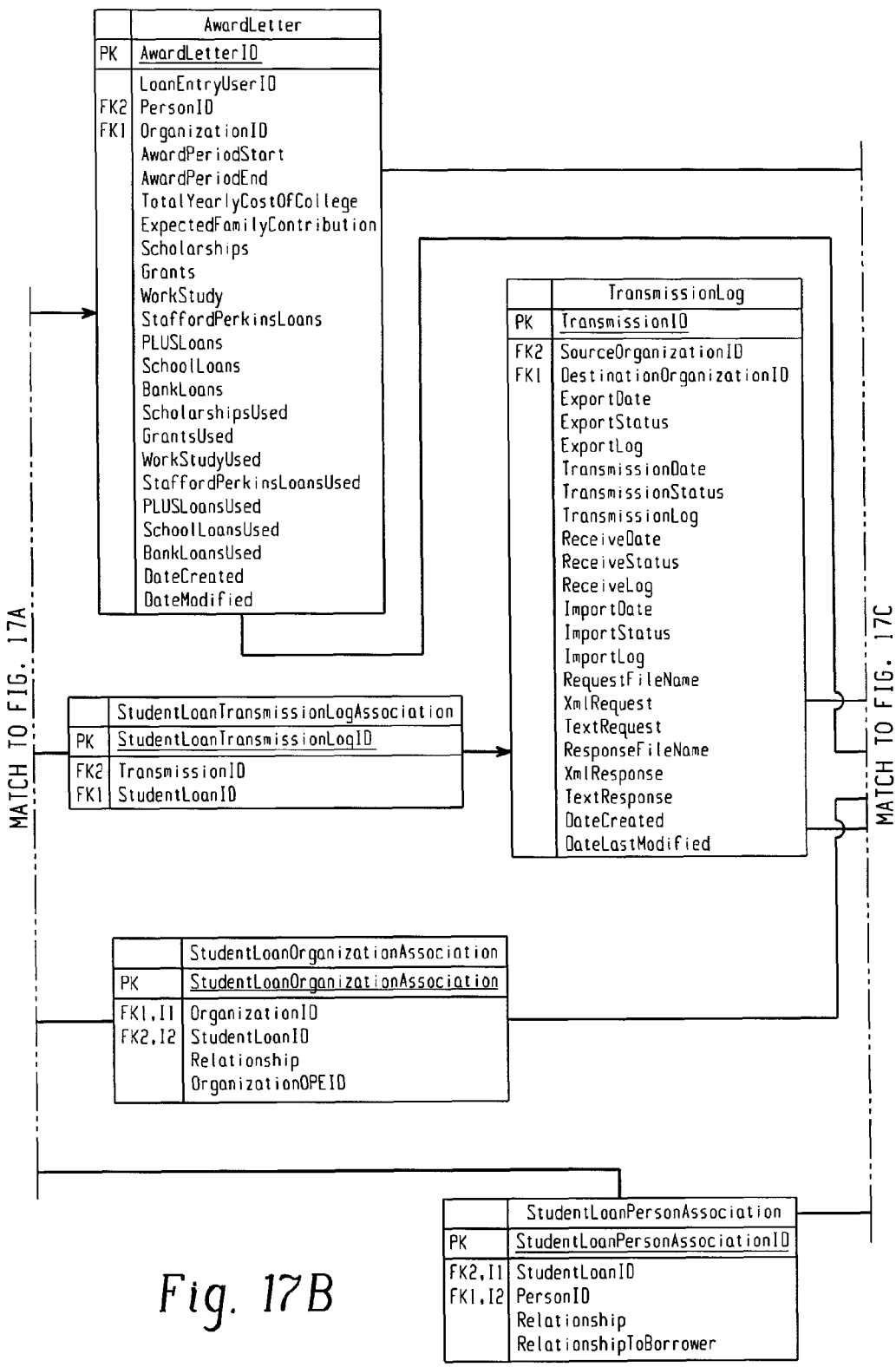
Figure 17C:
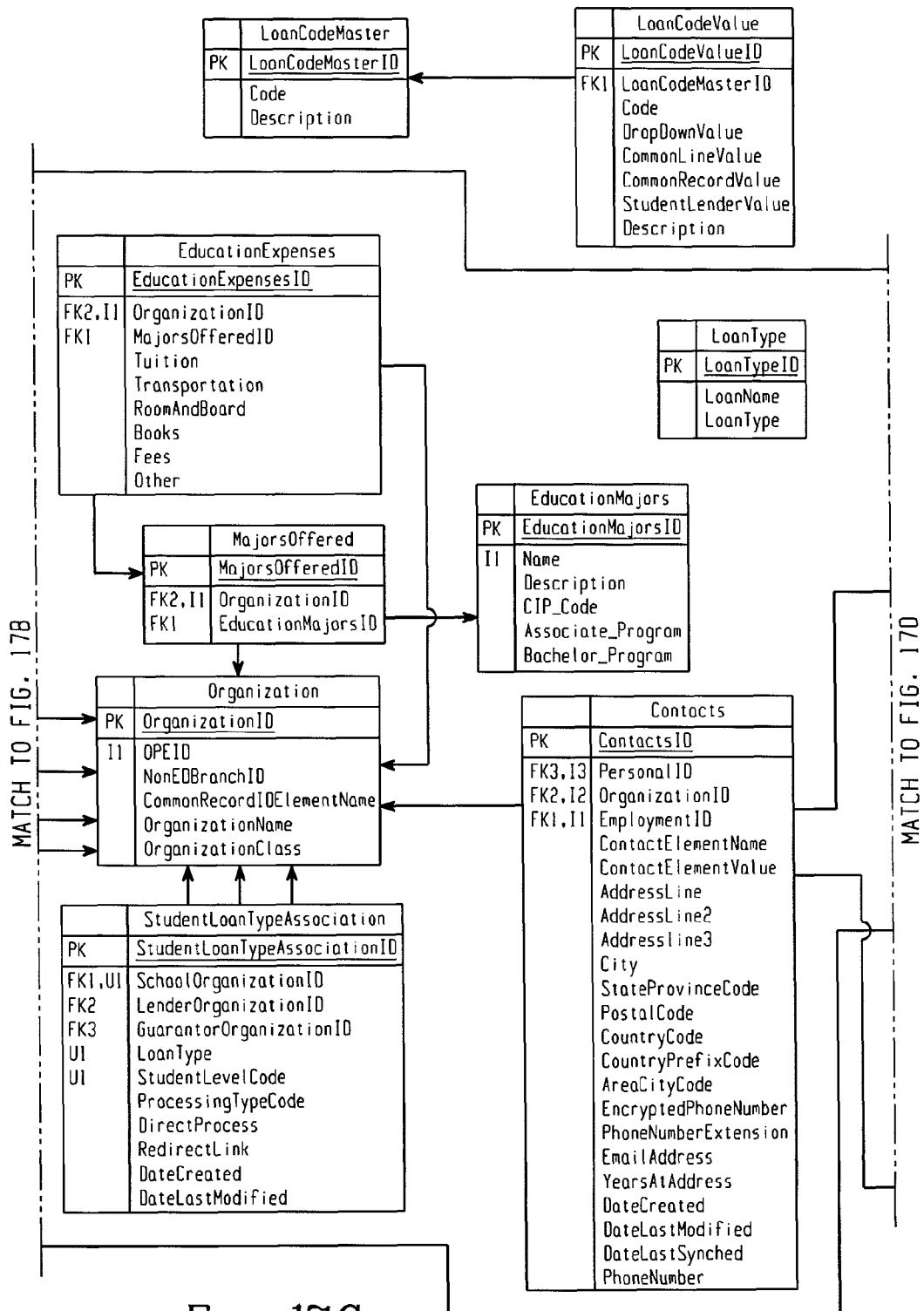
Figure 17D:
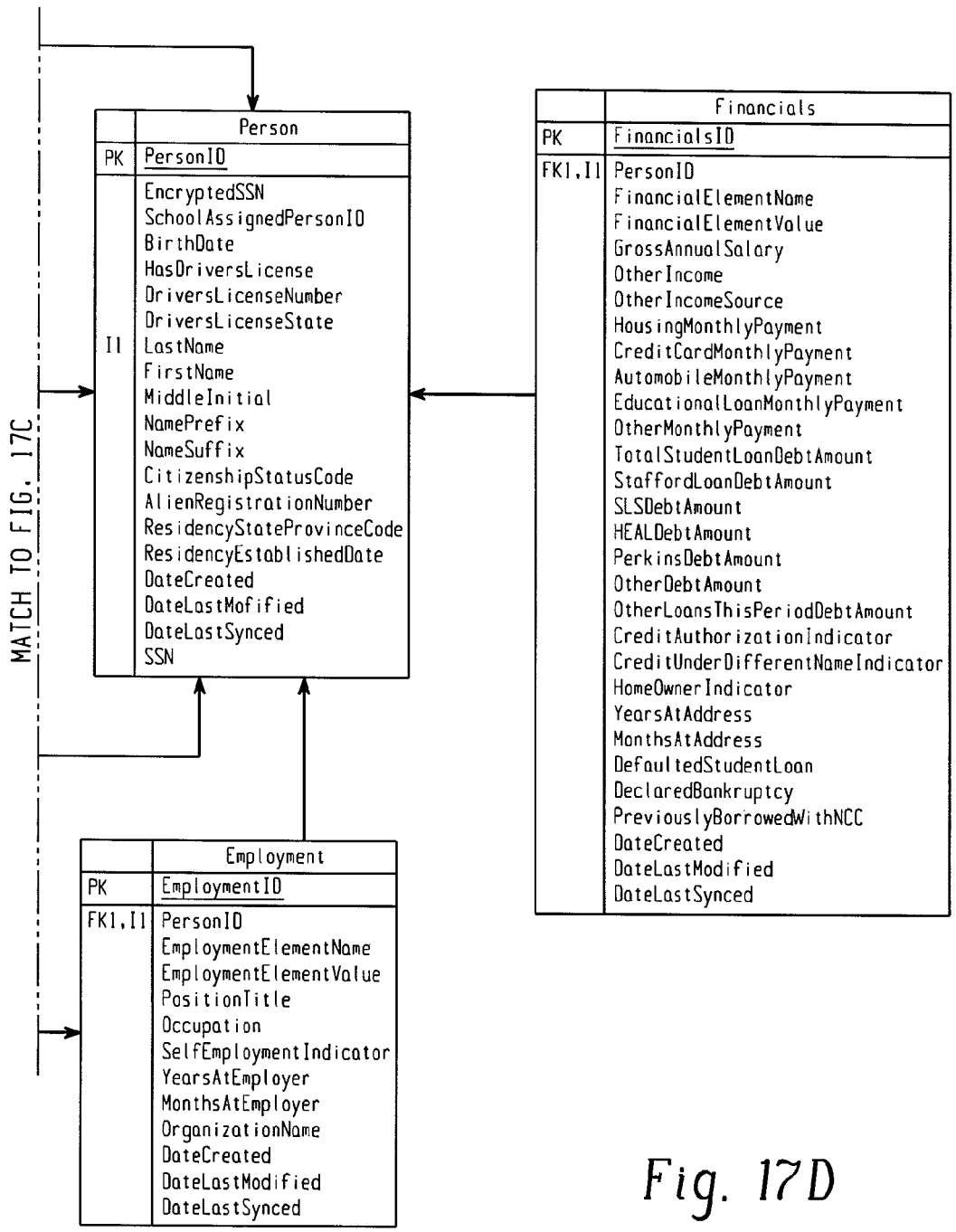

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, the common data structure can be implemented in many different ways, such as data stores that include RAM, ROM, Flash memory, flat files, databases (e.g., relational database management systems (RDBMS), multi-dimensional database systems, etc.), programming data structures, programming variables, IF-THEN (or similar type) statement constructs, etc.). For example, FIGS. 17A-17C show a data structure schema (implemented in an RDBMS environment) that can store information not only for the common data structure, but also information that can be used for other purposes (e.g., Student Loan Transmission logging information). The schema includes:

Disbursements table
Student Loan table
Award Letter table
Education Expenses table
Loan Types table
Majors Offered table
Education Majors table
Person table
Employment table
Financials table
Organization table
Student Loan Organization table
Student Loan Type Association table
Student Loan Person Association
Contacts table As another illustration, the systems and methods may be implemented on various types of computer architectures, such as for example on a networked system arrangement (e.g., Internet client-server configuration, application service provider configuration, etc.). As another example, it should be understood that the steps and the order of the steps described herein may be altered, modified, removed and/or augmented and still achieve the desired outcome.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented system for facilitating applying for student loans, said system comprising:
   one or more data processors configured to execute software instructions for generating a plurality of graphical user interfaces for display on a computer display device to a user;
   wherein the plurality of graphical user interfaces provide a series of questions to the user which relate to the applying of the student loans;
   wherein the plurality of graphical user interfaces are configured to capture responses from the user to the series of questions;
   wherein at least a majority of the questions are provided to the user without reference to any specific student loan application and removes a requirement to specify loan providers upfront in the series of questions;
   a common data structure which is stored on a computer-readable storage medium;
   wherein the common data structure stores the responses captured by the plurality of graphical user interfaces;
   the one or more data processors being configured to execute software instructions for populating multiple different student loan applications based upon the responses stored in the common data structure and according to a pre-specified criteria;
   wherein the pre-specified criteria includes populating and applying first for the least expensive of the multiple different student loan applications with respect to the student;
   wherein the populated multiple different student loan applications are submitted for approval.

2. The system of claim 1, further comprising:
   software instructions to dynamically generate a profile of the student to facilitate the applying for student loans.

3. The system of claim 2, wherein the dynamically generated profile of the student is provided in order to reduce the number of questions provided to the user for completing the multiple different student loan applications.

4. The system of claim 2, wherein the profile of the student is dynamically generated based upon pre-existing information about the student and upon information that is captured while the user is providing the responses to the plurality of graphical user interfaces.

5. The method of claim 2, wherein the dynamically generated profile of the student is generated based upon profile segments associated with different categories of students.

6. The method of claim 5, wherein the different categories of students include a field of study category and a school type category.

7. The system of claim 1, wherein the number of the questions is expanded or contracted based upon the dynamically generated profile of the student.

8. The system of claim 1, wherein the dynamically generated profiling is used for the entire student's financial need relative to the school the student wishes to attend.

9. The system of claim 1, wherein the user is a student or guardian of the student.

10. The system of claim 1, wherein the series of questions guides the user through the process of obtaining funds needed for attending a college or university.

11. The system of claim 1, wherein the common data structure provides a mechanism to the user for centralizing various student loan application data, thereby reducing or eliminating the fragmented nature of the student loan application process.

12. The system of claim 1, wherein the plurality of graphical user interfaces is for display on a web browser of a computer of the user.

13. The system of claim 1, wherein the plurality of graphical user interfaces is provided to the computer of the user through a wide area network.

14. The system of claim 13, wherein the wide area network is an Internet.

15. The system of claim 1, wherein the multiple different student loan applications include a federal subsidized Stafford loan, a federal unsubsidized Stafford loan, and a private bank loan.

16. The system of claim 15, wherein because at least a majority of the questions are provided to the user without reference to any specific student loan application, the plurality of graphical user interfaces maintain a continuity of appearance to the user who is providing responses in order to complete the multiple different student loan applications.

17. The system of claim 15, wherein because at least a majority of the questions are provided to the user without reference to any specific student loan application, there is a reduction in amount of effort by the user to complete the multiple different student loan applications because the user only has to enter the information once in order to satisfy approval criteria of the multiple different student loan applications.

18. The system of claim 1, wherein the series of questions to populate the common data structure is varied based upon initial information provided by the user.

19. The system of claim 18, wherein although the series of questions is varied, a common nucleus set of questions is established based upon demographic and transaction-related information that forms the loan approval criteria for the multiple different student loan applications.

20. The system of claim 19, wherein the initial information indicates whether the student wishes to pursue a private school or a public school.

21. The system of claim 1, wherein the user directly specifies which one or more loan applications a user wishes to apply;
wherein the user provides financial information that has been specified by a financial aid award letter.

22. The system of claim 1, wherein a reduction in number of questions is achieved by not providing a question in the series of questions that is not needed to satisfy the loan approval.

23. The system of claim 1, wherein the series of questions asks the user a sufficient number of questions to at least satisfy the least expensive loan's qualifying criteria, said system further comprising:
software instructions configured to execute on the one or more data processors and to provide one or more statistics about how much more information is needed to complete other student loan applications.

24. The system of claim 1, wherein the responses stored in the common data structure are persisted in order to utilize the responses in student loan applications in a subsequent school term.

25. The system of claim 1, further comprising:
software instructions configured to identify a plurality of student specific student loan applications based on said captured responses;
wherein the plurality of graphical user interfaces provides a second series of questions to the user based on the plurality of identified student specific loan applications;
wherein the second series of questions are ordered based on a cost associated with each of the identified student specific loan applications.

26. The system of claim 25, wherein the ordering of the second series of questions based upon cost facilitates processing of the least expensive loan application if the user breaks off from the second series of questions.

27. A computer-implemented method for facilitating applying for student loans, said method comprising:
generating, by executing software instructions on one or more data processors, a plurality of graphical user interfaces for display on a computer display device to a user;
wherein the plurality of graphical user interfaces provide a series of questions to the user which relate to the applying of the student loans;
wherein the plurality of graphical user interfaces are configured to capture responses from the user to the series of questions;
wherein at least a majority of the questions are provided to the user without reference to any specific student loan application and removes a requirement to specify loan providers upfront in the series of questions;
storing, by executing software instructions on the one or more data processors, the responses captured by the plurality of graphical user interfaces in a common data structure;
wherein the common data structure is stored on a computer-readable storage medium;
populating, by executing software instructions on the one or more data processors, multiple different student loan applications based upon the responses stored in the common data structure and according to a pre-specified criteria;
wherein the pre-specified criteria includes populating and applying first for the least expensive of the multiple different student loan applications with respect to the student;
wherein the populated multiple different student loan applications are submitted for approval.

* * * * *